United States Patent [19]
Senda et al.

[11] Patent Number: 5,396,276
[45] Date of Patent: Mar. 7, 1995

[54] OPTICAL BEAM SCANNING APPARATUS

[75] Inventors: Kazuto Senda, Hachiouji; Akira Arimoto, Kodaira, both of Japan

[73] Assignee: Hitachi, Ltd., Tokyo, Japan

[21] Appl. No.: 942,399

[22] Filed: Sep. 9, 1992

[30] Foreign Application Priority Data

Sep. 11, 1991 [JP] Japan .................. 3-231468

[51] Int. Cl.⁶ .................................. G01D 9/42
[52] U.S. Cl. ........................... 347/225; 347/134; 347/260; 358/302
[58] Field of Search ............... 346/108, 160; 358/296, 358/302

[56] References Cited

U.S. PATENT DOCUMENTS

| | | | |
|---|---|---|---|
| 4,370,678 | 1/1983 | Kitamura | 358/296 X |
| 4,499,437 | 2/1985 | Blazey | 346/108 X |
| 4,809,021 | 2/1989 | Check et al. | 346/108 |
| 5,189,441 | 2/1993 | Fukui et al. | 346/160 |

Primary Examiner—Benjamin R. Fuller
Assistant Examiner—Randy W. Gibson
Attorney, Agent, or Firm—Antonelli, Terry, Stout & Kraus

[57] ABSTRACT

An optical beam scanning apparatus comprises means of modulating the optical power of a laser beam produced by a laser beam source, means of shaping the laser beam profile, and means of deflecting and focusing the shaped laser beam on a scanning plane. The optical power of the laser beam is varied in synchronism with the variation of the optical power distribution so that the peak level of optical power of the laser beam is kept constant. The optical power of the laser beam on the photosensitive drum is kept constant irrespective of the beam diameter, and printed dots of intended diameters can be produced, whereby fine multi-tone images can be printed stably.

7 Claims, 8 Drawing Sheets

SHADE    LIGHT

SHADE    LIGHT

SHADE    LIGHT

OPTICAL BEAM SCANNING APPARATUS

BACKGROUND OF THE INVENTION

The present invention relates to an optical system capable of varying the spot diameter of a recording light beam during the recording operation, and particularly to an optical beam scanning apparatus suitable for use in a laser printer which performs multi-tone printing.

Conventional laser printers are designed to print multi-tone images in the form of a number of circular beam spots as shown in FIG. 1a. In the figure, beam spots shown by hatched circles move from left to right as shown by the arrows. A dark print portion has a high dot density and a bright print portion has a low dot density. In order to achieve finer multi-tone printing based on this method, it is necessary to use beam spots of smaller diameter and increase the number of beam scanning lines and the number of modulating operations. However, because of the mechanical beam scanning operation using a rotary multi-plane mirror or the like, the scanning speed cannot easily be increased. In case the number of scanning lines is increased, it adversely results in a slower printing speed. On the other hand, when the number of modulating operations is increased, it increases the computation time for the control, resulting ultimately in a slower printing speed.

There has been proposed a method of overcoming the above-mentioned problems, in which beam spots elongated in the second scanning direction are used for dark print portions (large solid areas) as shown in FIG. 1b. For example, a method is designed to vary the beam spot diameter by placing an electro-optical crystal, with electrodes being attached thereto, on the light path and applying an electric field to the crystal, as described in U.S. Pat. No. 4,768,043 and U.S. patent application Ser. No. 7/631257 (filed on Dec. 20, 1990 in connection with Japanese Patent Application Laid-Open No. 3-196023) now U.S. Pat. No. 5,196,697. Another method is designed to vary the beam spot diameter by placing a device of generating dynamic diffraction gratings of the surface acoustic wave (SAW) on the light path and varying the distance of gratings so that the diameter of beam spots formed of the 0th and ±1st order light is varied, as described in U.S. Pat. No. 5,053,619. Another method is designed to vary the beam spot diameter by using a semiconductor laser source, as described in U.S. patent application Ser. No. 7/747,189 (filed on Aug. 19, 1991) now U.S. Pat. No. 5,241,554.

The above-mentioned conventional methods are designed to operate at a constant optical power of laser, and therefore they are deficient in that the peak level of optical power varies when the beam spot diameter is varied. For example, a laser beam printer has its drum given optical sensitivity characteristics as shown in FIG. 2, and the peak power decreases as the beam spot diameter is increased. Accordingly, as shown in FIG. 3, printed dots 20a and 20b become smaller as the power decreases. This means that the elongated dot area becomes smaller than the circular dot area in FIG. 1b, that is opposed to the intention, and the print quality is degraded significantly.

SUMMARY OF THE INVENTION

An object of the present invention is to provide an optical beam scanning apparatus capable of preventing the deterioration of print quality due to the variation of the peak level of laser optical power attributable to the variation of beam spot diameter which has been the case of the conventional apparatus. In order to achieve the above objective, the optical beam scanning apparatus based on this invention comprises a laser source, means of modulating the optical power of laser produced by the laser source, means of shaping the laser beam profile, and means of deflecting and focusing the shaped light beam on the printing surface, wherein the optical power of laser is varied in response to the variation of the beam spot diameter so that the peak level of optical power is kept constant on the printing surface. The optical power of laser is controlled by varying the output of the laser source if it is possible by itself, such as the case of a semiconductor laser source, or otherwise a modulating device is provided externally.

DESCRIPTION OF THE PREFERRED EMBODIMENTS

Figure 1A:
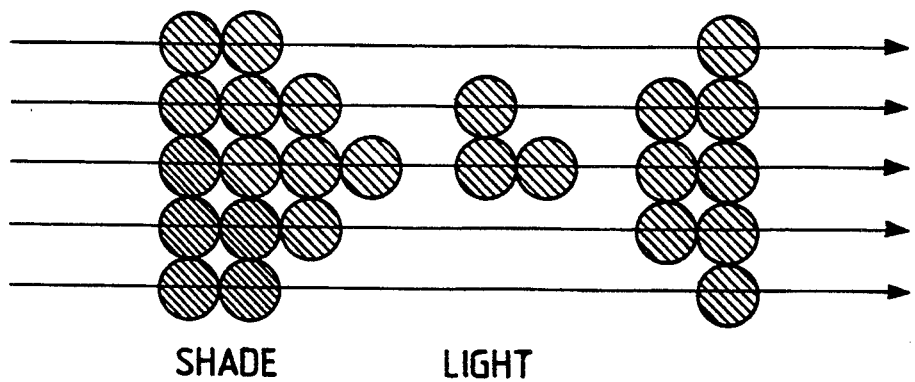
FIG. 1a and FIG. 1b are diagrams used to explain the method of multi-tone printing of laser printers.
Figure 1B:
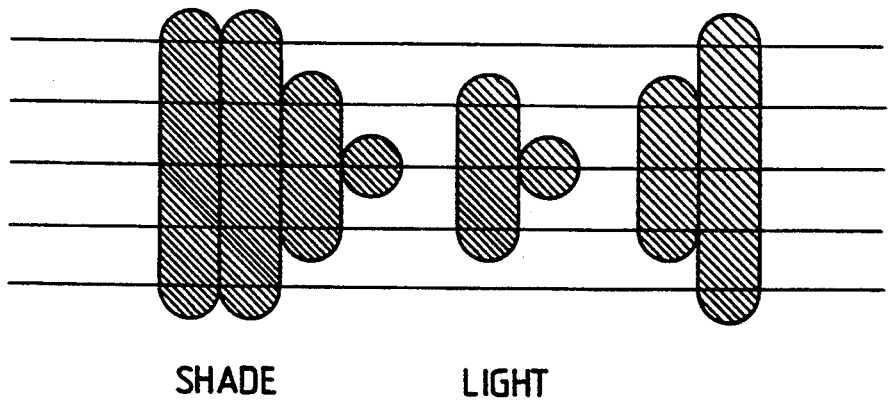
Figure 2:
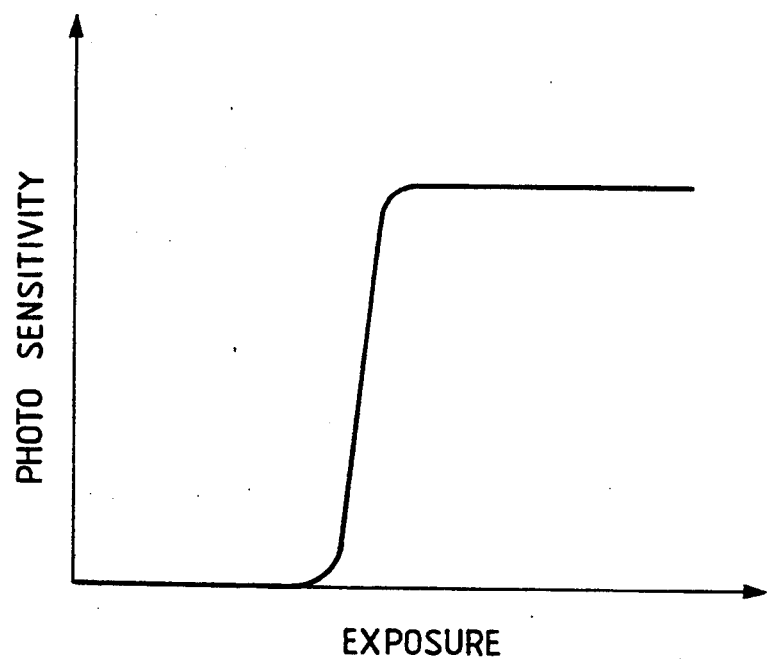
FIG. 2 is a graph showing the relation between the exposure level and the optical sensitivity on the printing surface.
Figure 3:
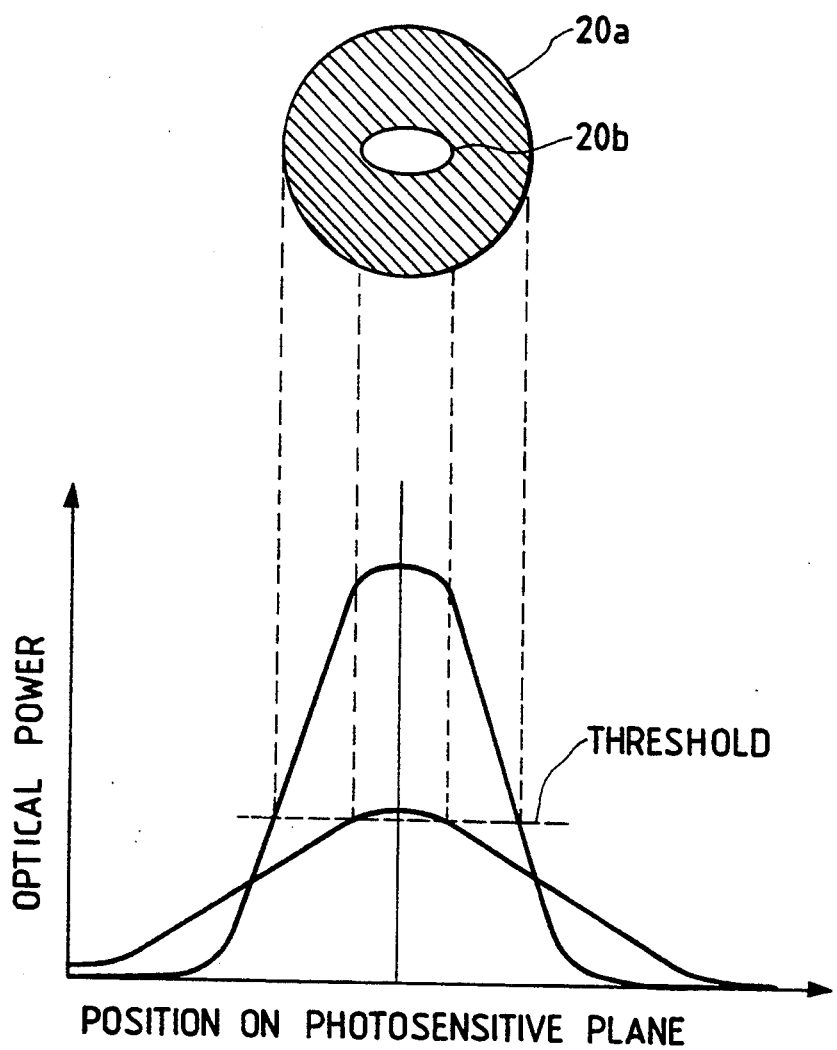
FIG. 3 is a diagram used to explain the variation of photosensitive area in response to the variation of beam spot diameter.
Figure 4:
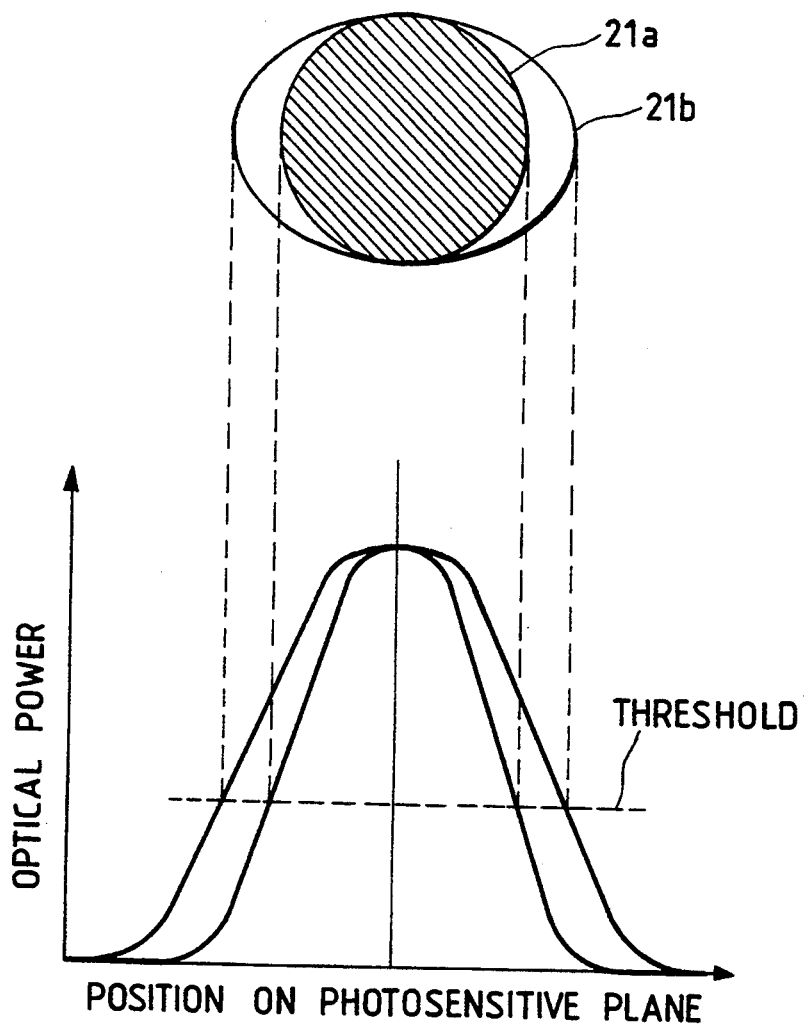
FIG. 4 is a diagram used to explain the variation of photosensitive area in response to the variation of beam spot diameter.

As shown in FIG. 3, when the beam spot diameter is increased, with the optical power of laser being kept constant, the peak level falls and a printed dot which is determined by a certain threshold level can become smaller unexpectedly. This impropriety can be avoided by varying the optical power of laser in response to the beam spot diameter so that the peak level is constant for any spot diameter, and the intended dot diameter can be obtained on the printing surface as shown in FIG. 4. In the example of FIG. 1b, hatched portions (large solid areas) can be produced by using laser beam spots which are elongated in the second scanning direction, and it becomes possible to print high-resolution multi-tone images without increasing the scanning frequency and modulation frequency.

Figure 5:
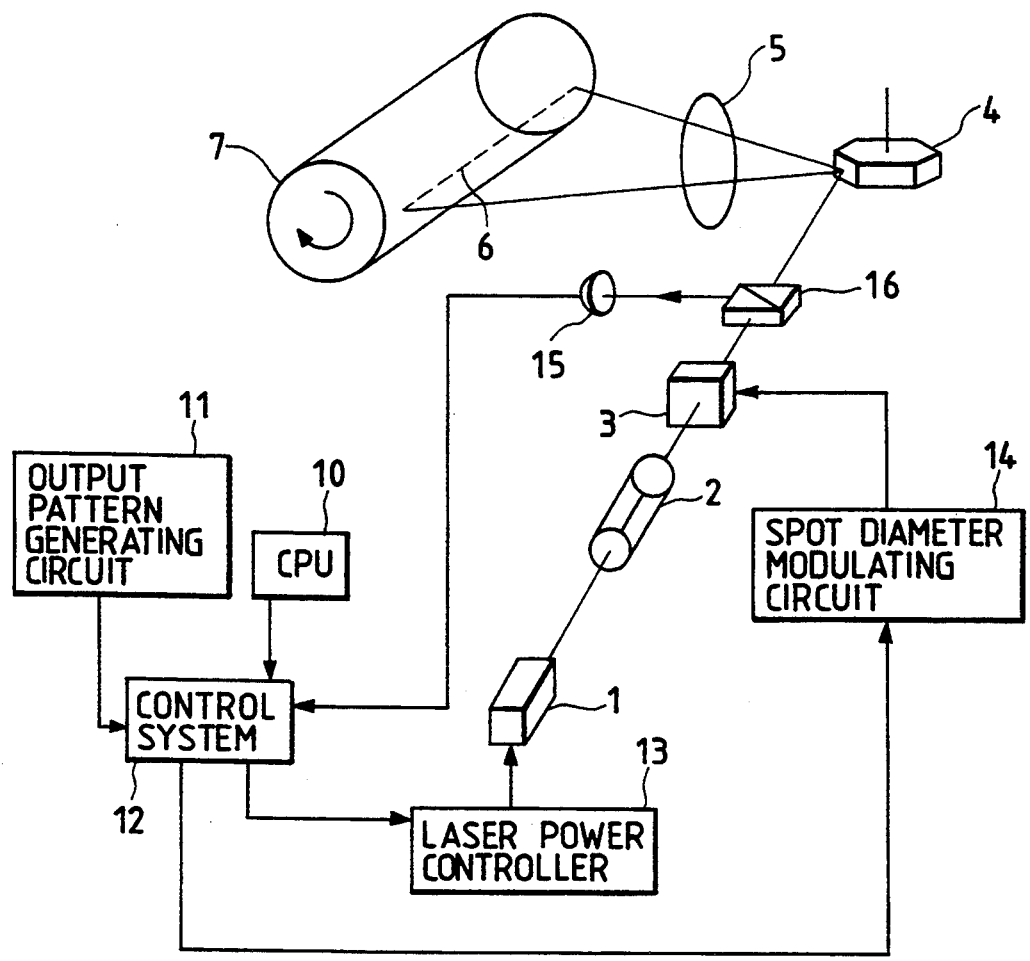
FIG. 5 is a diagram showing the arrangement of the optical beam scanning apparatus based on an embodiment of this invention.

FIG. 5 shows the optical system based on an embodiment of this invention, in which multi-tone images are printed on an electro-photographic drum or film through the laser beam scanning.

The system includes a light source 1 which is a laser oscillator having the ability of modulation. A laser beam emitted by the laser source 1 has its optical power subjected to the on-off modulation by the signal which is produced by a dot pattern generation circuit 11 and conditioned by a control system 12 and laser power controller 13. The laser beam is next conducted through a beam shaping optical system 2, and incident to a spot diameter varying device 3. The device 3 operates to vary the beam spot only in the direction perpendicular to the scanning line 6 (second scanning direction) on the printing surface in accordance with the dot pattern information which is provided by the dot pattern generation circuit 11 and conditioned by the control system 12 and a spot diameter modulation circuit 14. The laser beam at the output of the spot diameter varying device 3 is partially branched by means of a beam splitter 16 and detected by means of a photosensor 15, and the resulting signal is used to control the laser power controller 13 through the control system 12 so that the peak level of optical power is constant. The photosensor 15 has its output sampled in synchronism with the on-off modulation of laser beam. Alternatively, the laser power controller 13 may be controlled in accordance with the laser power vs. spot diameter function for providing a constant peak level prepared in advance. Finally, the laser beam is conducted by such a beam deflector as a rotary multi-plane mirror 4 and such a focusing lens as a F$\theta$ lens 5, and projected on to the printing drum surface.

Figure 6:
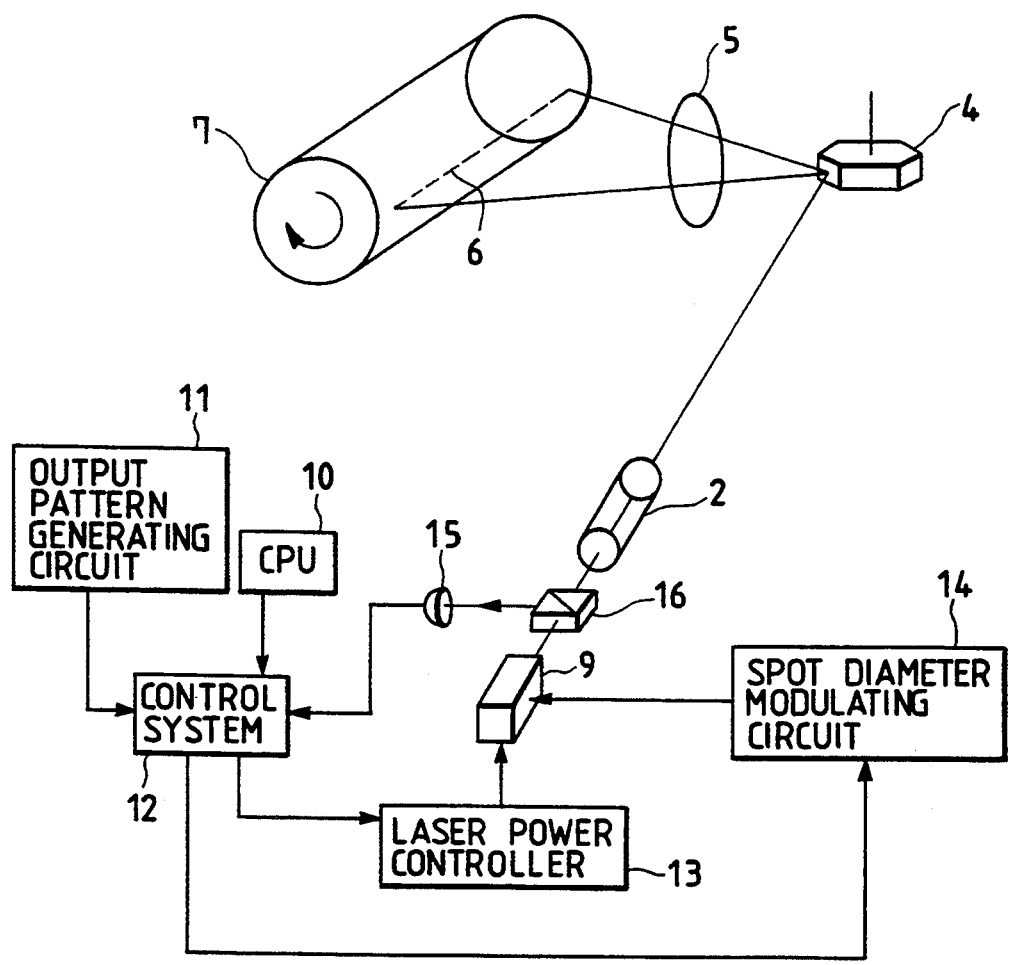
FIG. 6 and FIG. 7 are diagrams showing the arrangements of the optical beam scanning apparatus based on other embodiments of this invention.

FIG. 6 shows another embodiment of this invention. This embodiment is different from the previous embodiment of FIG. 5 in that the light source 9 is a semiconductor laser oscillator and the spot diameter modulation circuit 14 directly controls the laser oscillator 9 to vary the beam spot diameter. Using the semiconductor laser source with the ability of varying the beam spot diameter by itself eliminates the need of the external spot diameter varying device 3 and enables the photosensor 15 to be placed near the laser source 9, whereby the optical system can be made compact.

Figure 7:
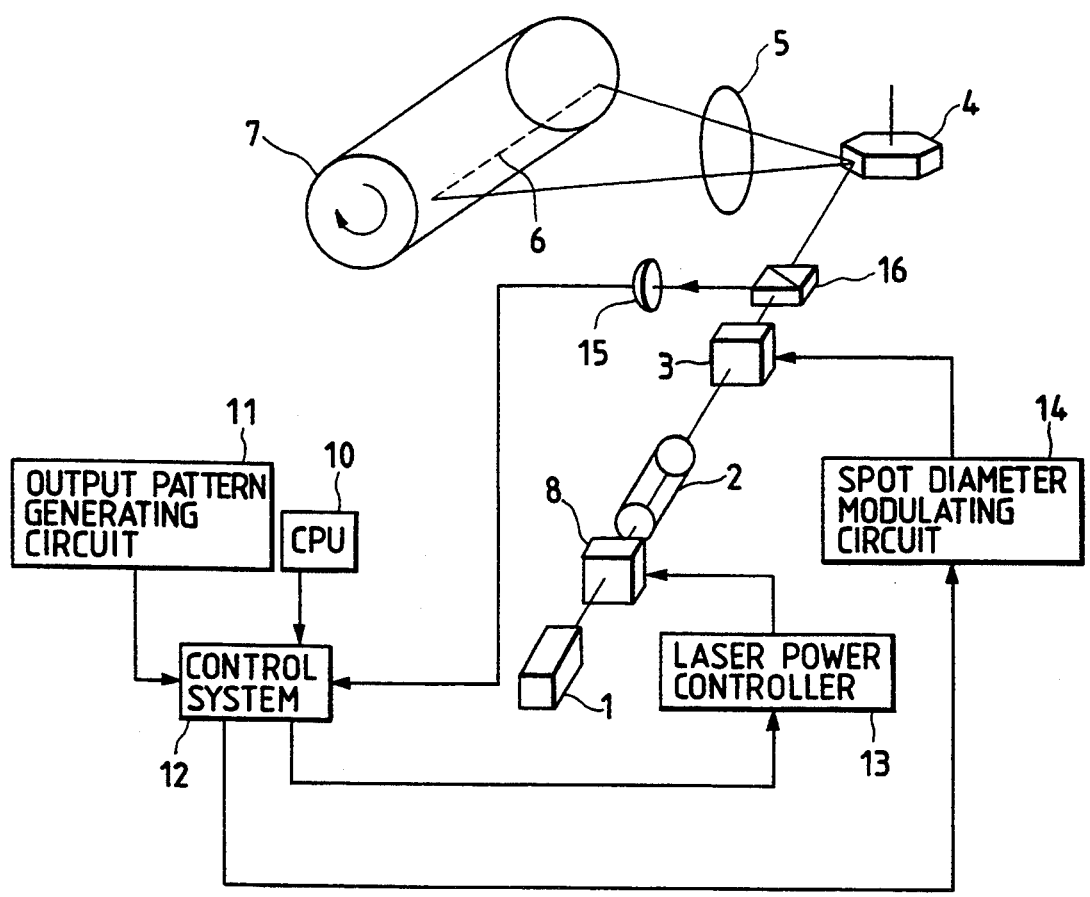

FIG. 7 shows still another embodiment of this invention. This embodiment is intended for the case where the laser source does not have the ability of modulation, and a modulator 8 is provided outside of the laser source 1.

Figure 8:
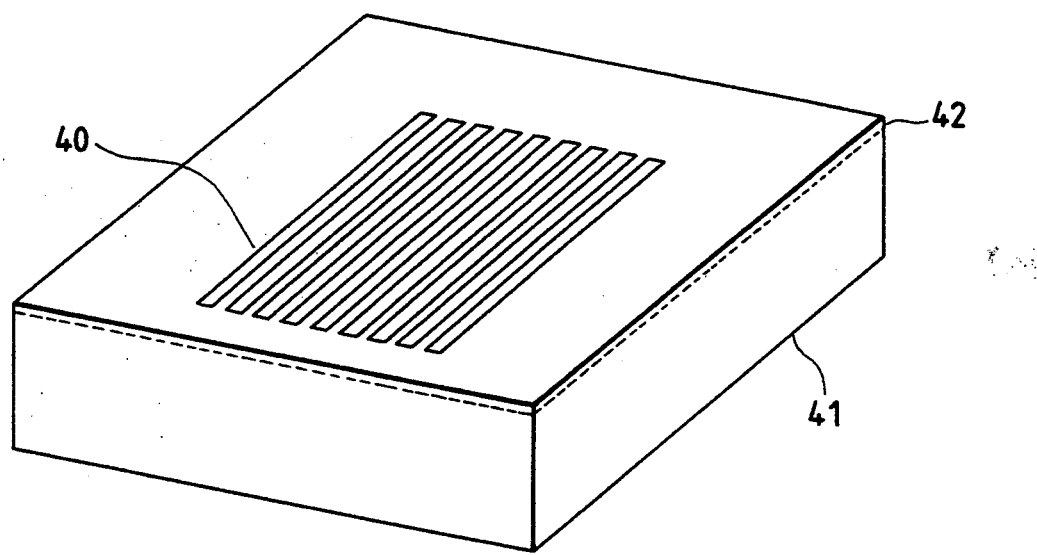
FIG. 8 is a diagram showing an example of the structure of the spot diameter varying device.
Figure 9:
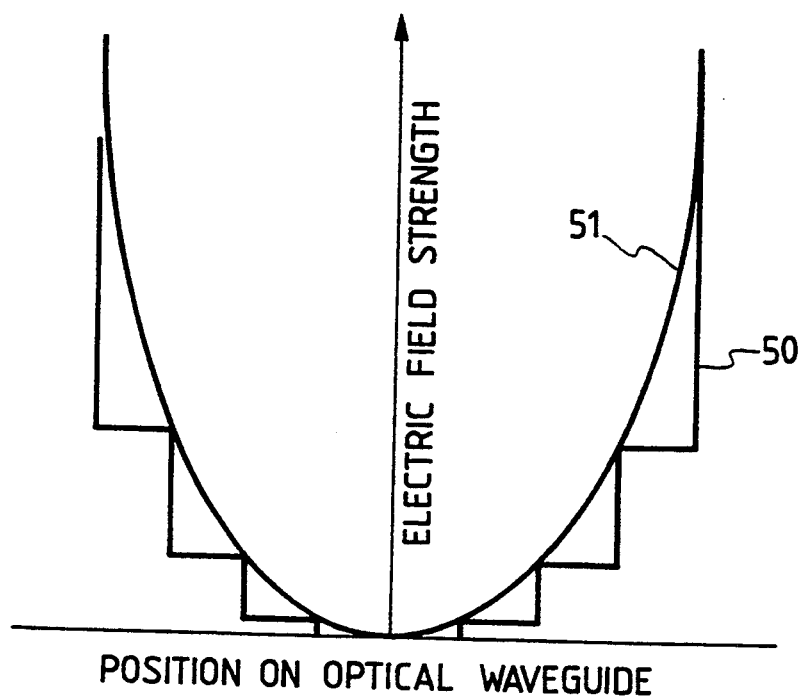
FIG. 9 is a graph showing the quadratic curve 51 which is produced when the electric field 50 is applied to the electrodes 40 of the spot diameter varying device shown in FIG. 8.

FIG. 8 shows an example of the spot diameter varying device 3. A thin-film waveguide 42 is formed on an electro-optical crystal 41 such as LiNbO$_3$, KH$_2$PO$_4$, or LiTaO$_3$, and electrodes 40 of equal length are attached in parallel to the waveguide direction. An electric field 50 having the envelope of a quadratic curve 51 as shown in FIG. 9 is applied to the electrodes 40, and the distribution of refractivity inside the waveguide varies in proportion to the strength of electric field 50, yielding a lens effect. The taper of laser beam varies by varying the strength of electric field, and the beam spot diameter on the scanning line 6 can be varied accordingly.

Figure 10:
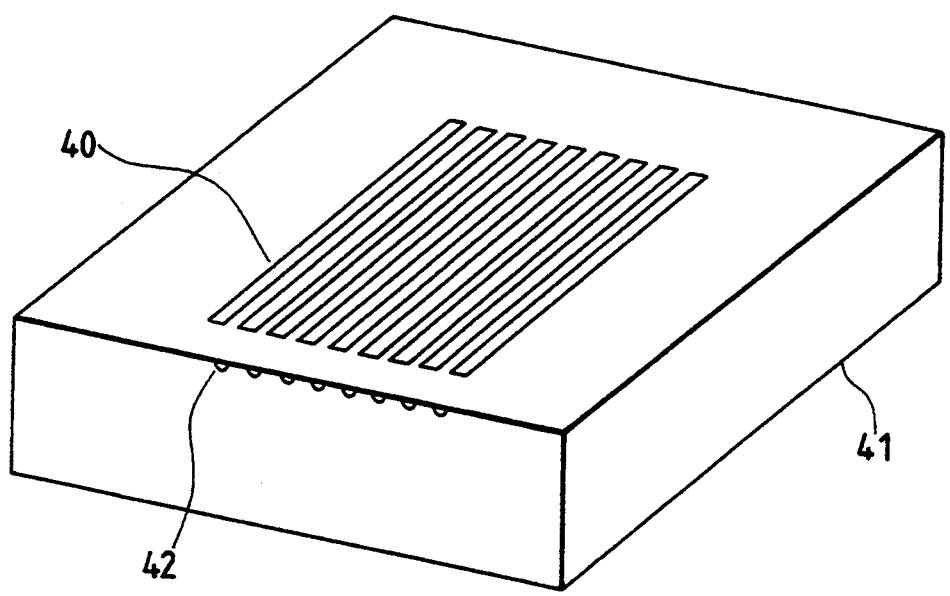
FIG. 10 is a diagram showing another example of the structure of the spot diameter varying device.

FIG. 10 shows another example of the spot diameter varying device 3. In this structure, a waveguide 42 is formed only between the electrodes or beneath the electrodes. Since the refractivity varies in different degree depending on the direction of electric field, and there is a difference of refractivity at a position between electrodes and at a position beneath the electrodes in the case of a slab waveguide. Therefore, it is difficult to have the distribution of refractivity shown in FIG. 9. The structure of FIG. 10 uses the electric field of one direction, making the refractivity constant in the waveguide, and it overcomes the above-mentioned problem.

Although the spot diameter varying devices explained above use electrodes of equal dimensions and equal spacing for the sake of simplify, electrodes may be of different design provided that the device creates a smooth electric field distribution.

Although the spot diameter varying devices explained above are based on the electro-optical effect, devices of other type such as that based on the acoustic-optical effect may be used.

According to the present invention, beam spots of intended diameters can be produced on the printing surface, and high-resolution multi-tone images can be printed stably.

What is claimed is:

1. An optical beam scanning apparatus comprising:
   a laser beam source providing a laser beam to be applied to a scanning plane along a scanning direction;
   a modulating means for modulating an optical power of said laser beam produced by said laser beam source;
   a shaping means for shaping said laser beam in order to shape a profile of said shaped laser beam in a secondary scanning direction which is different from said primary scanning direction; and
   a deflecting means for deflecting and focusing said shaped laser beam from said shaping means along said primary scanning direction on said scanning plane, said optical power of said laser beam being varied so that a peak level of intensity distribution in said laser beam profile is kept constant.

2. An optical beam scanning apparatus comprising:
   a laser beam source providing a laser beam to be applied to a scanning plane along a primary scanning direction;
   a modulating means for modulating an optical power of said laser beam produced by said laser beam source;
   a shaping means for shaping said laser beam in order to shape a profile of said shaped laser beam in a secondary scanning direction which is different from said primary scanning direction; and
   a deflecting means for deflecting and focusing said shaped laser beam from said shaping means along said primary scanning direction on said scanning plane, said optical power of said laser beam being varied in synchronism with a variation of an optical power distribution so that an intensity distribution in said laser beam profile is kept constant.

3. An optical beam scanning apparatus according claim 2, wherein said optical power of said laser beam is varied in correspondence to shaping of said laser beam profile in said secondary scanning direction.

4. An optical beam scanning apparatus according to claim 2, wherein said laser beam source comprises a laser source having an ability of controlling said optical power of said laser beam so that a peak level of said intensity distribution in the shaped said laser beam is kept constant.

5. An optical beam scanning apparatus according to claim 2, comprising:
   a modulator provided separately from said laser beam source in a case where said laser beam source does not have an ability of modulation.

6. An optical beam scanning apparatus comprising:

a semiconductor laser beam source providing a laser beam to be applied to a scanning plane along a primary scanning direction, and having an ability of shaping said laser beam so that an intensity distribution in a profile of said shaped laser beam is kept constant;

a means for modulating an optical power of said laser beam produced by said semiconductor laser beam source;

a shaping means for shaping said laser beam in order to shape said laser beam profile in a secondary scanning direction which is different from said primary scanning direction; and a deflecting means for deflecting and focusing said shaped laser beam from said shaping means along said primary scanning direction on said scanning plane.

7. An optical beam scanning apparatus comprising:

a laser beam source providing a laser beam to be applied to a scanning plane along a primary scanning direction;

a modulating means for modulating an optical power of said laser beam produced by said laser beam source;

a shaping means for shaping said laser beam in order to shape a profile of said shaped laser beam in a secondary scanning direction which is different from said primary scanning direction;

a deflecting means for deflecting and focusing said shaped said laser beam from said shaping means along said primary scanning direction on said scanning plane;

a varying means for varying said optical power of said laser beam in synchronism with the shaped laser beam so that a peak level of an intensity distribution in the shaped laser beam profile is kept constant; and a modulator which modulates said optical power of said laser beam.

* * * * *

UNITED STATES PATENT AND TRADEMARK OFFICE
CERTIFICATE OF CORRECTION

PATENT NO. : 5,396,276
DATED : March 7, 1995
INVENTOR(S) : Kazuto SENDA and Akira ARIMOTO It is certified that error appears in the above-identified patent and that said Letters Patent is hereby corrected as shown below:

ON THE TITLE PAGE,

ITEM [73]: Assignment should read as follows:
Hitachi, Ltd., Tokyo, Japan
and
Hitachi Koki Co., Ltd., Tokyo, Japan Signed and Sealed this Twenty-fifth Day of July, 1995

Attest:

BRUCE LEHMAN

Attesting Officer        Commissioner of Patents and Trademarks